United States Patent [19]

Eaton et al.

[11] Patent Number: 5,245,649

[45] Date of Patent: Sep. 14, 1993

[54] SELECTIVE CALL RECEIVER CAPABLE OF BEING COUPLED TO A TELEPHONE ANSWERING MACHINE

[75] Inventors: Eric T. Eaton, Lake Worth; Rodney S. Whaley, Lantana, both of Fla.

[73] Assignee: Motorola, Inc., Schaumburg, Ill.

[21] Appl. No.: 830,788

[22] Filed: Feb. 4, 1992

Related U.S. Application Data

[63] Continuation of Ser. No. 559,816, Jul. 30, 1990, abandoned.

[51] Int. Cl.⁵ ............................................. H04M 1/64
[52] U.S. Cl. .................................... 379/67; 379/56; 379/57; 340/825.44
[58] Field of Search ............... 379/56, 57, 77, 67, 379/88, 69; 340/825.44

[56] References Cited

U.S. PATENT DOCUMENTS

| | | | |
|---|---|---|---|
| 3,513,443 | 5/1970 | Andersen | 340/825.44 |
| 4,172,969 | 10/1979 | Levine et al. | 340/825.44 |
| 4,356,519 | 10/1982 | Cogdell, Jr. | 340/825.44 |
| 4,518,961 | 5/1985 | Davis et al. | |
| 4,525,600 | 6/1985 | Hashimoto | 379/70 |
| 4,649,538 | 3/1987 | DeLuca et al. | |
| 4,742,516 | 5/1988 | Yamaguchi | 340/825.44 |
| 4,755,816 | 7/1988 | DeLuca | |
| 4,775,996 | 10/1988 | Emerson et al. | 379/56 |
| 4,821,308 | 4/1989 | Hashimoto | 340/825.44 |
| 4,841,562 | 6/1989 | Lem | 340/105 |
| 4,856,051 | 8/1989 | Ohtawara et al. | 379/67 |
| 4,873,713 | 10/1989 | Yamanouchi et al. | 379/88 |
| 4,876,537 | 10/1989 | Oyamada | 340/825 |
| 4,885,766 | 12/1989 | Yasuoka et al. | 379/105 |
| 4,942,598 | 7/1990 | Davis | 379/67 |
| 4,961,216 | 10/1990 | Baehr et al. | 379/67 |
| 4,965,569 | 10/1990 | Bennett et al. | 379/88 |

OTHER PUBLICATIONS

Metagram of Millicom, Inc.
Nationwide test messaging with customized regional coverage, Mobile Comm.

Primary Examiner—Jin F. Ng
Assistant Examiner—Huyen D. Le
Attorney, Agent, or Firm—Robert L. Breeden; William E. Koch; Thomas G. Berry

[57] ABSTRACT

A communication system (10) includes a selective call receiver (12) for receiving transmitted information coupled to a telephone answering machine (44) via a fiber optic cable (48). The fiber optic link (48) transfers information from the selective call receiver (12) to the telephone answering machine (44), thereby allowing messages to the selective call receiver (12) to be accessed from any world-wide, conventional telephone system.

4 Claims, 2 Drawing Sheets

SELECTIVE CALL RECEIVER CAPABLE OF BEING COUPLED TO A TELEPHONE ANSWERING MACHINE

This application is a continuation of Ser. No. 07/559,816 filed Jul. 30, 1990, now abandoned

FIELD OF THE INVENTION

This invention relates in general to the field of selective call receivers, and more particularly to a selective call receiver integrated with a telephone answering machine via fiber optic cables, which allows information received by the selective call receiver to be accessed world-wide using a conventional telephone system.

BACKGROUND OF THE INVENTION

Conventional selective call receivers, including pagers, may reliably receive messages provided by various nationwide services within a designated (i.e. functional) message transmission area. Traveling outside the functional message transmission area, whether intentionally or unintentionally, prevents transmitted signals from reaching the desired selective call receiver, which may result in the user missing a number of messages. Many times, the user is unaware that they have ventured beyond the functional transmission area, and therefore, is also unaware of the missed messages. This limitation in the functional transmission area is frustrating to many users as it prevents the selective call receiver from being effective.

Thus, a need exists for a method of receiving messages outside the functional transmission area using a conventional selective call receiver.

SUMMARY OF THE INVENTION

A communication system comprises a battery powered paging receiver for receiving transmitted paging messages. The battery powered paging receiver comprises a decoder for decoding received paging messages, and a storage element for storing the decoded paging messages. The battery powered paging receiver further comprises a modulation element for modulating a light source with information representing the decoded paging messages, and an optical coupling element for coupling the battery powered paging receiver to an optical information channel. The battery powered paging receiver further comprises a power coupling element for coupling the battery powered paging receiver to an energy source for selectively operating the battery powered paging receiver via the energy source. The communication system further comprises an information storage device. The information storage device comprises an optical coupling element for coupling the storage device to the optical information channel, and an optical receiver for receiving optical information representing the decoded paging messages. The information storage device further comprises a storage element for storing information representing the received optical information, and a communication element responsive to telephone-type communication for generating audible signals representing the stored information and for transmitting the audible signals via telephone-type communication. The information storage device further comprises the energy source coupled to the paging receiver for providing energy to the battery powered paging receiver.

DETAILED DESCRIPTION OF THE INVENTION

Figure 1:
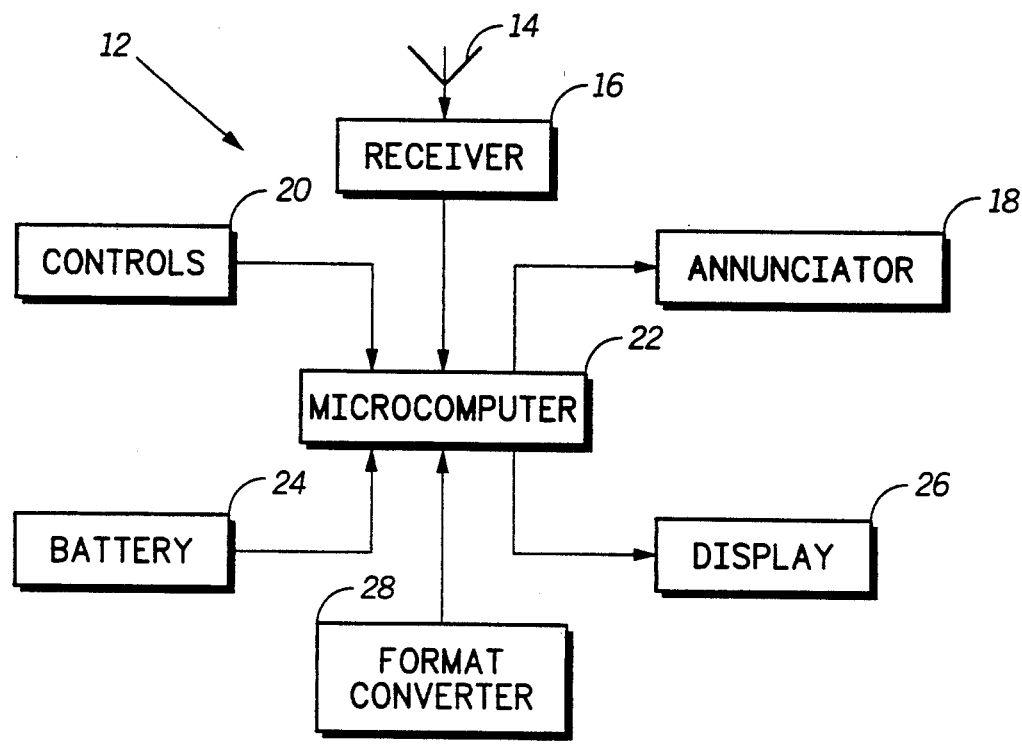
FIG. 1 is a block diagram of a selective call receiver according to the preferred embodiment of the present invention.

FIG. 1 is a block diagram of a selective call receiver generally shown at 12, in which the preferred embodiment of the present invention may be implemented. The selective call receiver 12 includes an antenna 14 and a receiver 16 for generally receiving transmitted selective call addresses and messages information. The selective call receiver 12 also includes a microcomputer 22 coupled to an annunciator apparatus 18, a battery 24, a control apparatus 20 (e.g., on/off, volume control, and display control switches), and a display 26 for displaying message and control information as is well known to those skilled in the art. The receiver 16 comprises a format converter 28, positioned within the selective call receiver 12, to convert decoded information to an optical signal in the preferred embodiment. The decoded information may be converted to a variety of mediums without deviating from the intent of the invention. For a more detailed description of the structure and operation of a selective call radio paging receiver of the type shown in FIG. 1, reference is made to U.S. Pat. No. 4,518,961; U.S. Pat. No. 4,649,538; and U.S. Pat. No. 4,755,816; the teachings of which are hereby incorporated by reference.

Figure 2:
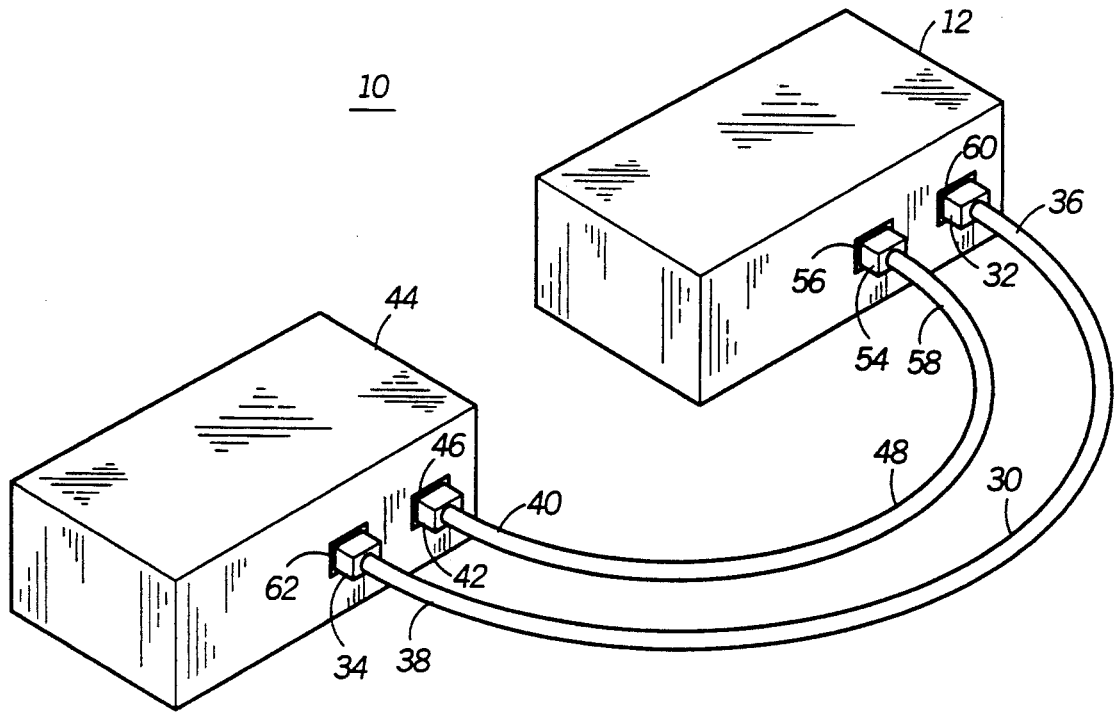
FIG. 2 is a perspective view of the preferred embodiment of the present invention.

Referring to FIG. 2, an information channel (e.g., fiber optic cable) 48 is removably attached to a selective call receiver 12 at a first end 58 via a first snap-fit plug 54, which engages a first port (e.g., telephone jack) 56 in the selective call receiver 12 of a communication system 10. In the preferred embodiment, the first snap-fit plug 54 comprises a removeable, snap-fit telephone plug as found on many telephones. However, a variety of interfaces may be used without deviating from the intent of the invention. A second end 40 of the fiber optic cable 48 comprises a second snap-fit plug 42, which is removably attached to a message transmission center 44 (e.g., telephone answering machine) via a second port (e.g., telephone jack) 46.

In addition, the message transmission center 44 is optionally coupled to the selective call receiver 12 via a power supply cord 30, which supplies power to the selective call receiver 12. The power supply cord 30 includes first and second snap-fit plugs 32 and 34 positioned at first and second ends 36 and 38, respectively. The first snap-fit plugs 32 and 34 of the power supply cord 30 engages the selective call receiver 12 and the message transmission center 44 via third and fourth ports 60 and 62, respectively. A conventional, regulated power supply (not shown) is positioned within the message transmission center 44. The supply voltage required to operate the selective call receiver 12 is then transferred from the message transmission center 44 to the selective call receiver 12 via the power supply cord 30, eliminating the need for a standard selective call receiver charger.

Figure 3:
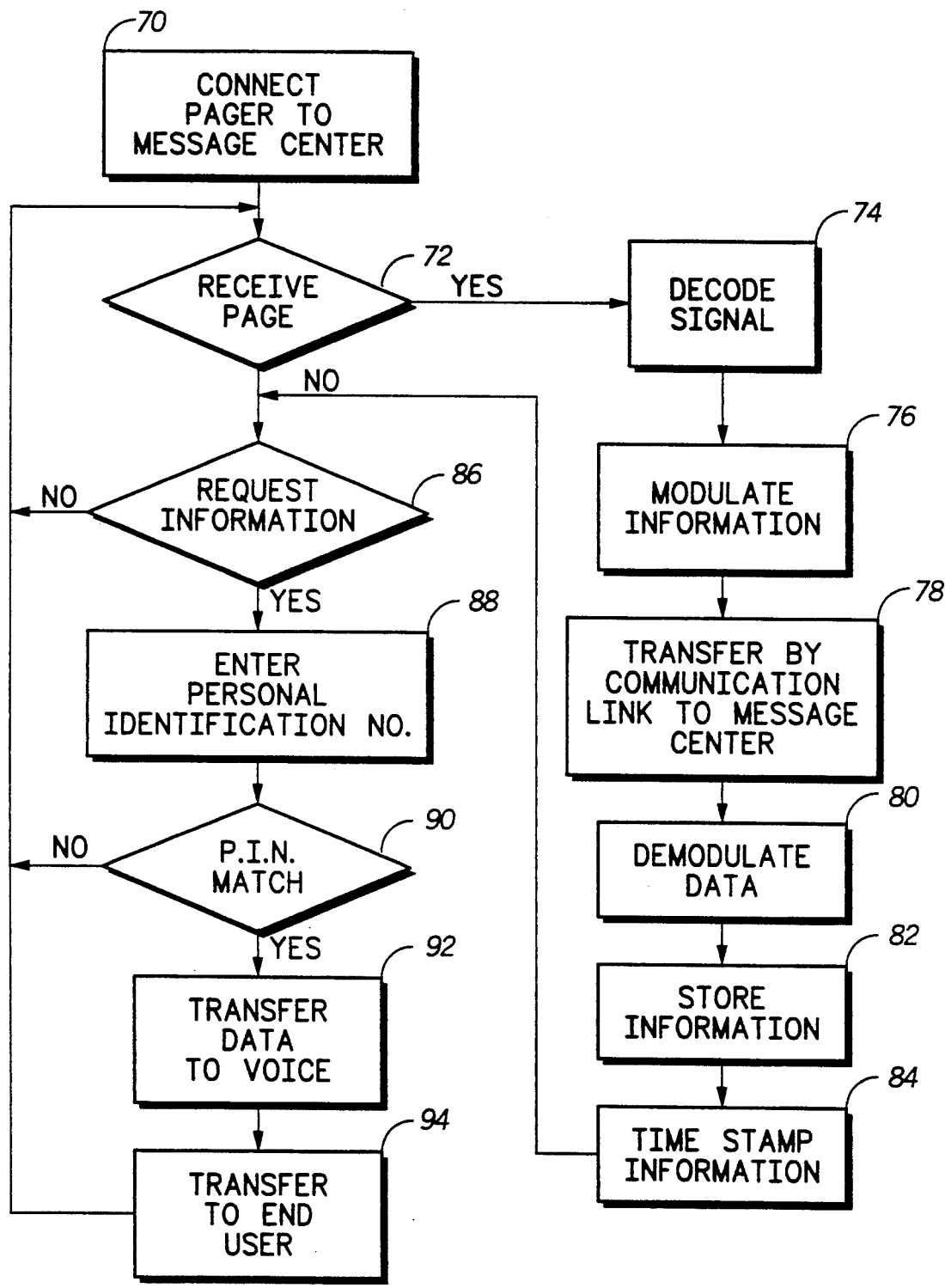
FIG. 3 is a flow chart of the preferred embodiment of the present invention.

Referring to FIG. 3, in step 70 of the preferred embodiment, the selective call receiver 12 is coupled to the message transmission center 44 using the optical link 48 as described in FIG. 2. In operation, the selective call receiver 12 may receive a transmitted signal (i.e. page) as is well known in the art, step 72. The pager decodes the signal using conventional paging software, step 74. The decoded base band data is then used to modulate the drive current to a light emitting diode (LED). These fluctuations in drive current modulate the LED light output resulting in a recognizable optical signal being generated, step 76. This information is transferred by a communication link to the message center 44, step 78. In the preferred embodiment, the modulated light wave of step 78 is transmitted by the fiber optic link 48, however, a variety of signal carriers may be utilized without deviating from the intent of the invention.

There are several advantages of having the pager 12 coupled to the answering machine 44 by the fiber optic cable 48. This embodiment gives a universal connection which is not subject to missed information caused by vibration or movement. In addition, there is no electrostatic discharge (ESD), radio frequency interference (RFI), nor electromagnetic interference (EMI) problems with the fiber optic link 48. However, a variety of other mediums (e.g., infrared) may be used without deviating from the intent of the invention.

The modulate light wave is received and detected (i.e. demodulated) by a photo detecting device (not shown) in the message center 44, step 80. In the preferred embodiment, the photo detecting device comprises a fiber optic port (e.g., photo diode or PIN diode) and conventional supporting circuitry. However, a variety of other photo detecting devices (e.g., optical coupler) may be used without deviating from the intent of the invention. For a more detailed description of digital to optical code conversion, reference is made to pages 14–15, 26–30, 103, and 497–507 of *Principles of Modern Optical Systems* by Ivan Andonovic and Deepak Uttamchandani, published in 1989, by Artech House in Norwood, Mass., which is well known in the art. The demodulated code is then stored in the memory of the message center 44, step 82. In the preferred embodiment, a time stamp feature, step 84, accompanies each received message as is known in the art of answering machines. However, the time stamp feature may be eliminated without deviating from the intent of the invention.

The user has the option of requesting the data with or without the receipt of a transmitted signal, step 86. If the user does not request the data, control reverts back to step 72, where the message center 44 is ready to receive the next page. If the user does choose to receive any messages stored in the message center's (44) memory, the user inputs their personal identification number (PIN), step 88, which activates the play back mode. If the PIN number does not match the pre-set code, step 90, control reverts back to step 72, enabling the selective call receiver 12 and message center 44 to receive incoming pages. If the PIN number does not match the pre-set code, the data stored previously by the data processor is converted back to a current fluctuation, which is used to drive a voice synthesizer, step 92. The voice synthesizer relays the stored message to the end user, step 94. The user may input a variety of codes to selectively retrieve information from the message center's (44) memory as is known in the art of answering machines. Afterwards, control automatically reverts back to step 72, enabling the selective call receiver 12 and message center 44 to receive incoming pages.

The benefits of using the telephone answering machine 44 in conjunction with a telephone system are readily understood in that one may receive world-wide telephone messages. Adding the pager 12 to the telephone answering machine 44 increases the system's (10) overall effectiveness in that the user may now receive pages as well as telephone messages and access them world-wide. The pager user would no longer be concerned with the boundaries of their functional service area. Instead, the pager user would simply need to have access to a conventional telephone system. In addition, it would not be necessary to subscribe to multiple service areas in order to receive pages. The pager user would also have the advantage of receiving messages at home with increased privacy, requiring only that their pager number be given out and not their private telephone number. A further advantage of the invention is that the answering machine 44 would significantly increase the selective call receiver's (12) available memory, therefore, the pager user would be able to receive a higher volume of pages than without the answering machine 44.

We claim:

1. A communication system, comprising:
 a battery powered paging receiver for receiving transmitted paging messages, the battery powered paging receiver comprising:
  means for decoding received paging messages;
  means for storing decoded paging messages;
  means for modulating a light source with information representing the decoded paging messages;
  means for coupling the battery powered paging receiver to an optical information channel; and
  means for coupling the battery powered paging receiver to an energy source for selectively operating the battery powered paging receiver via the energy source; and
 an information storage device, comprising:
  means for coupling the storage device to the optical information channel;
  means for receiving optical information representing the decoded paging messages;
  means for storing information representing the received optical information;
  means responsive to telephone-type communication for generating audible signals representing the stored information and for transmitting the audible signals via telephone-type communication; and
  said energy source coupled to the paging receiver for providing energy to the battery powered paging receiver.

2. The communication system of claim 1, wherein the paging receiver includes means for providing an annunciation indicating receipt of a paging message.

3. The communication system of claim 1, wherein the paging receiver includes means for displaying a received paging message.

4. The communication system of claim 1, wherein the paging receiver includes means for recharging the battery via the energy source.

* * * * *